United States Patent Office 3,644,492
Patented Feb. 22, 1972

3,644,492
ESTERS OF HEXAFLUOROPROPYLENE OXIDE POLYMER ACIDS AND POLYALKYLENE GLYCOLS
Philip Lee Bartlett, Wilmington, Del., assignor to E. I. du Pont de Nemours and Company, Wilmington, Del.
No Drawing. Filed July 30, 1969, Ser. No. 846,238
Int. Cl. C07c 69/66
U.S. Cl. 260—484 R          11 Claims

ABSTRACT OF THE DISCLOSURE

Esters derived from hexafluoropropylene oxide polymer acids and polyalkylene glycols having the formula:

$$R_fO[CF(CF_3)CF_2O]_nCF(CF_3)$$
$$COO—R^1—O(CHR^2CHR^3O)_yR^4$$

wherein $R_f$ is a perfluoroalkyl radical having 1 to 8 carbon atoms, $n$ is an integer of 0 to 100, $R^1$ is an alkylene radical having 2 to 12 carbon atoms, $R^2$ is hydrogen or an alkyl radical having 1 to 4 carbon atoms, $R^3$ is hydrogen or an alkyl radical having 1 to 4 carbon atoms, at least one of $R^2$ and $R^3$ in each repeating unit being hydrogen, $y$ is an integer of 1 to 60, and $R^4$ is hydrogen or an alkyl radical having 1 to 4 carbon atoms. These esters function efficiently as surfactants and emulsifying agents.

BACKGROUND OF THE INVENTION

(1) Field of the invention

This invention relates to novel esters of hexafluoropropylene oxide polymer acids and more particularly to esters derived from hexafluoropropylene oxide polymer acids and polyalkylene glycols which function efficiently as surface active agents and may be used as emulsifying agents even in the formation of stable emulsions of polyfluorinated compounds and water.

(2) Description of the prior art

Mackenzie in U.S. Pat. 3,274,244 discloses phosphate di-esters having the formula

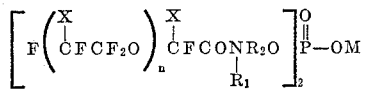

where X is F or $CF_3$, $n$ is an integer from 2 to 6, $R_1$ is hydrogen or $C_1$ to $C_4$ alkyl and $R_2$ is $C_2$ to $C_4$ alkylene. These phosphate di-esters are useful as oil repellents for paper.

Preparation of surface active agents by condensation of active hydrogen-containing compounds with alkylene oxide is well known in the art. Reactions such as:

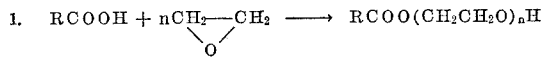

and

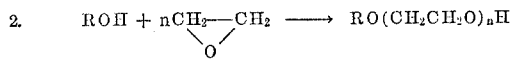

may be found for example in "Encyclopedia of Surface Active Agents," J. P. Sisley, vol. II, p. 139, Chemical Publishing Co., Inc. New York, N.Y., 1964. These alkylene oxide extended surface active agents are commonly referred to as non-ionic surfactants in contrast to cationic or anionic surfactants which are usually characterized by the presence of a positively or negatively charged group such as

or $CO_2^\ominus$ in the molecule. In contrast to these cationic and anionic surfactants, alkylene oxide extended surfactants are generally unaffected by ionizable compounds such as salts, acids and bases which might be present in the emulsion system. These nonionic alkylene oxide extended surfactants are characterized in general by the presence of an oleophilic group at one end of the molecule and a hydrophilic group at the other end which consequently impart bifunctional properties to the molecule enabling its use as an emulsifying agent. A satisfactory emulsifying agent is a material which by virtue of preferential solubility of each end of the molecule in each of the two phases reduces the surface tension of said phases so that an emulsion can result. In the usual emulsion system consisting of oleaginous material and aqueous phase, most of the above described non-ionic surfactants perform satisfactorily. However, when an emulsion of polyfluorinated compounds and water is desired, the above surfactants are not satisfactory. The reason for unsatisfactory performance is that polyfluorinated materials are generally both oleophobic and hydrophobic and neither end of the molecules of most surfactants is soluble in the polyfluorinated phase. The simultaneous oleophobic and hydrophobic nature of the polyfluorinated materials can thus be utilized very effectively in the treatment of various substrates such as textiles, leather, cellulose etc. to confer both oil and water repellency to such substrates.

Novel hexafluoropropylene oxide polymer acid esters have now been discovered which are efficient surfactants and which are useful as emulsifying agents even when a stable emulsion of a polyfluorinated compound and water is desired.

SUMMARY OF THE INVENTION

The present invention comprises compounds having the formula $$R_fO[CF(CF_3)CF_2O]_nCF(CF_3)$$
$$COO—R^1—O(CHR^2CHR^3)_yR^4$$

wherein $R_f$ is a perfluoroalkyl radical having 1 to 8 carbon atoms, $n$ is an integer of 0 to 100, $R^1$ is an alkylene radical having 2 to 12 carbon atoms, $R^2$ is hydrogen or an alkyl radical having 1 to 4 carbon atoms, $R^3$ is hydrogen or an alkyl radical having 1 to 4 carbon atoms, at least one of $R^2$ and $R^3$ in each repeating unit being hydrogen, $y$ is an integer of 1 to 60, and $R^4$ is hydrogen or an alkyl radical having 1 to 4 carbon atoms.

DESCRIPTION OF THE INVENTION

The compounds of this invention are esters derived from hexafluoropropylene oxide polymer acids and polyalkylene glycols, which esters are represented by the above formula. For practical reasons such as ease of handling while making the esters, economy, and availability or ease of preparation the values of $R_f$, $n$, $y$, $R^1$, $R^2$, $R^3$ and $R^4$ have been thus limited, and likewise at least one of $R^2$ and $R^3$ in each repeating unit —(CHR$^2$CHR$^3$O)— has been defined as hydrogen. It is however conceivable that these limits could be extended to produce additional useful esters.

These compounds are useful as surface active agents as will be seen in Example 4. Further, due to the presence in each ester of hydrophilic groups as well as groups which are attractive to perfluorinated compounds, they are also useful as emulsifying agents even for perfluorinated compounds with water. Yet another utility of the ester of this invention lies in their ability to modify the surface characteristics of water and oil in such a way that the aqueous phase will spread evenly on the surface of the oil. This property is of great importance in the use of water or foam formulations for fighting hydrocarbon fires since addition of proper amounts of esters of this invention to the water or foam formulation will allow them to spread in a filmlike fashion over the surface of the hydrocarbon thus eliminating exposure of the hydrocarbon to the air and preventing reignition of the fire.

The esters of this invention may be prepared by any one of several methods.

METHOD 1

An acid fluoride $R_fO[CF(CF_3)CF_2O]_nCFCF_3COF$ could be reacted with polyalkylene glycol $$HO(CHR^2CHR^3O)_{y+1}R^4$$

in the presence of an acid acceptor, as indicated below:

$CF_3CF_2CF_2O[CF(CF_3)CF_2O]_nCF(CF_3)COF$
  $+HO(CHR^2CHR^3)_{y+1}(R^4) \rightarrow CF_3CF_2CF_2O$
    $[CF(CF_3)CF_2O]_nCF(CF_3)COOCHR^2CHR^3O$
                        $(CHR^2CHR^3O)_y(R^4)$

METHOD 2

A carboxylic acid may be reacted with alkylene oxide, as indicated below:

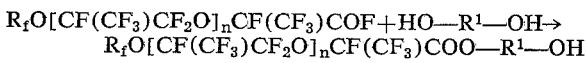
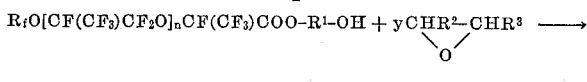

METHOD 3

A hydroxy ester of hexafluoropropylene oxide polymer acid may first be formed by reacting an acyl fluoride with polyalkylene glycol, HO—R¹—OH, and this hydroxy ester may then be reacted with alkylene oxide, as indicated below.

Step 1

$R_fO[CF(CF_3)CF_2O]_nCF(CF_3)COF+HO—R^1—OH \rightarrow$
$R_fO[CF(CF_3)CF_2O]_nCF(CF_3)COO—R^1—OH$

Step 2

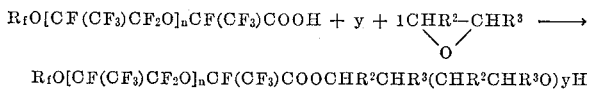

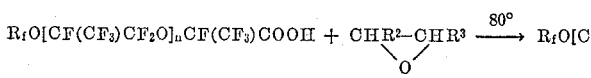

The glycols, HO—R¹—OH, wherein R¹ is an alkylene of 2 to 12 carbon atoms are well known in the art and most are commercially available while others may be readily prepared by those skilled in the art.

The acid fluorides,

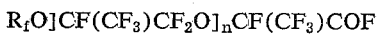

utilized in the preparation of the compounds of this invention can be prepared by polymerizing hexafluoropropylene oxide alone or with a compound such as a carbonyl or acid fluoride in the presence of fluoride catalysts such as cesium fluoride. The nature of $R_f$ is determined by the appropriate choice of compounds polymerized with hexafluoropropylene oxide. Polymerization of hexafluoropropylene oxide by itself gives polyfluoroalkyl ether acyl fluoride in which $R_f$ is $CF_3CF_2CF_2$—; polymerization in the presence of $COF_2$ gives $R_f=CF_3$; polymerization in the presence of perfluoroaliphatic acyl fluoride, $C_aF_{2a+1}COF$, wherein $a$ is 1 to 8, gives $R_f=C_aF_{2a+1}CF_2$—. These preparations may be found in U.S. Pats. 2,250,808; 3,274,239; and 3,322,826, and French Pats. 1,359,426 and 1,362,548.

The following examples describe the invention in further detail. These examples are intended to be merely illustrative of the invention and not in limitation thereof. Unless otherwise indicated all parts are by weight.

EXAMPLE 1

Preparation of the ester $CF_3CF_2CF_2O[CF(CF_3)CF_2O]_8$ $CF(CF_3)COOCH_2CH_2O(CH_2CH_2O)_6CH_3$ according to Method 1

wherein $R_f=CF_3CF_2CF_2$—

$CF_3CF_2CF_2O[CF(CF_3)CF_2O]_nCF(CF_3)COF$ ($n=8$, 200 g. 0.12 mole) was combined with 400 ml. 1,1,2-trichloro-1,2,2-trifluoroethane and 20 ml. of triethylamine (acid acceptor) in a flask and the contents cooled to 10–15° C. Monomethyl ether of polyethylene glycol, $$HOCH_2CH_2O(CH_2CH_2O)_6CH_3$$

("Carbowax-350": Union Carbide) (42.2 g.; 0.12 mole) dissolved in 100 ml. of 1,1,2-trichloro-1,2,2-trifluoroethane was added over a period of one hour maintaining the temperature in the reaction flask at 10–15° C. The reaction mixture was then stirred for four hours at 10–15° C. and the precipitated triethylamine hydrofluoride was removed by filtration. The 1,1,2-trichloro-1,2,2-trifluoroethane solution of the reaction product was then clarified by using decolorizing carbon. After removal of the solvent trichlorotrifluoroethane by distillation or evaporation, 224 g. (94.6% yield of the product $CF_3CF_2CF_2O[CF(CF_3)CF_2O]_8CF(CF_3)$
                 $COOCH_2CH_2O(CH_2CH_2O)_6CH_3$ was obtained as an oil which was slightly yellow to amber in color. Fluorine percent calculated 52.6; fluorine percent found 52.5.

EXAMPLE 2

Preparation of the ester $CF_3CF_2CF_2O[CF(CF_3)CF_2O]$ $CF(CF_3)COOCH_2CH_2O(CH_2CH_2O)_5H$ according to Method 2

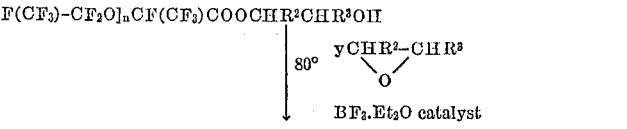

where $R_f=CF_3CF_2CF_2$—

$CF_3CF_2CF_2O[CF(CF_3)CF_2O]_nCF(CF_3)COOH$ ($n=1$, 50 g. 0.10 mole) which is readily prepared from the corresponding acyl fluoride by hydrolysis, was placed in an autoclave with ethylene oxide (4.5 g. 0.1 mole). Upon heating to 80° C., the pressure due to the presence of ethylene oxide quickly dropped yielding the hydroxyethyl ester of the acid in essentially quantitative yield (54.3 g. 99.9% yield). For further condensation with ethylene oxide, the product may be left in the autoclave and the reaction with ethylene oxide continued using boron trifluoride-diethyletherate complex as catalyst. Thus to the above described reaction product in the autoclave, ethylene oxide (2.5 g. 0.57 mole) and boron trifluoride-diethyletherate complex (0.8 g. 0.006 mole) were added and the mixture heated to 80° C. for three hours at which time the pressure had decreased to essentially atmospheric pressure. The reaction product was then subjected to a topping operation which comprised heating at 50° C. and 5 mm.

Hg pressure until constant weight was obtained. This latter operation removed any low boiling contaminant, including 1,4-dioxane which was formed by the dimerization of ethylene oxide. The yield of the colorless liquid product of the formula $$CF_3CF_2CF_2O[CF(CF_3)CF_2O]CF(CF_3)COOCH_2CH_2O(CH_2CH_2O)_5H$$

was 76.3 g. (96.2%) and indicated presence of six moles of ethylene oxide per mole of the acid. Fluorine percent calculated 42.5; fluorine percent found 42.3.

By varying the ratio of ethylene oxide to acid, a higher or lower number of ethylene oxide units may be incorporated into the molecule. Other alkylene oxides, for example, propylene oxide may be used in place of ethylene oxide. With propylene oxide, somewhat higher temperatures, 125–150° C., instead of 80° C. are preferably used to complete the reaction in reasonable time. It is to be understood, as is well known in the art (e.g. S. Winstein and R. B. Henderson in "Heterocyclic Compounds" Elderfield ed. vol. I p. 37 John Wiley and Sons, New York, N.Y. 1950) that acid-catalyzed opening of substituted ethylene oxide, as e.g. propylene oxide, results in products which are isomeric mixtures in contrast to base-catalyzed openings which result in predominantly one isomer.

Using the procedures described above, the following alkylene oxide esters of hexafluoropropylene oxide acids were prepared:

TABLE I

| Compound C $R_f$=$CF_3CF_2CF_2$— | Percent fluorine Calc'd | Percent fluorine Found | Product percent yield |
|---|---|---|---|
| 1.... $R_fO[CF(CF_3)CF_2O]CF(CF_3)COOCH_2CH_2O(CH_2CH_2O)_6CH_3$ | 39.0 | 39.2 | 92.3 |
| 2.... $R_fO[CF(CF_3)CF_2O]CF(CF_3)COOCH_2CH_2O(CH_2CH_2O)_{10}CH_3$ | 31.4 | 31.3 | 93.4 |
| 3.... $R_fO[CF(CF_3)CF_2O]CF(CF_3)COOCH_2CH_2O(CH_2CH_2O)_{15}CH_3$ | 26.3 | 26.2 | 95.6 |
| 4.... $R_fO[CF(CF_3)CF_2O]CF(CF_3)COOCH_2CH_2O(CH_2CH_2O)_{45}CH_3$ | 13.0 | 13.0 | 97.2 |
| 5.... $R_fO[CF(CF_3)CF_2O]CF(CF_3)COOCH_2CH_2O(CH_2CH_2O)_5H$ | 42.5 | 42.3 | 96.8 |
| 6.... $R_fO[CF(CF_3)CF_2O]CF(CF_3)COOCH_2CH_2O(CH_2CH_2O)_{30}H$ | 18.0 | 17.9 | 95.2 |
| 7.... $R_fO[CF(CF_3)CF_2O]CF(CF_3)COOCH(CH_3)CH_2O(CH(CH_3)CH_2O)_9H$ | 30.5 | 30.6 | 91.7 |
| 8.... $R_fO[CF(CF_3)CF_2O]_3CF(CF_3)COOCH_2CH_2O(CH_2CH_2O)_6CH_3$ | 47.5 | 47.1 | 95.5 |
| 9.... $R_fO[CF(CF_3)CF_2O]_3CF(CF_3)COOCH_2CH_2O(CH_2CH_2O)_6CH_3$ | 52.6 | 52.4 | 89.4 |
| 10... $R_fO[CF(CF_3)CF_2O]_3CF(CF_3)COOCH_2CH_2O(CH_2CH_2O)_{10}CH_3$ | 47.7 | 47.5 | 92.4 |
| 11... $R_fO[CF(CF_3)CF_2O]_3CF(CF_3)COOCH_2CH_2O(CH_2CH_2O)_{45}CH_3$ | 29.6 | 29.5 | 94.7 |
| 12... $R_fO[CF(CF_3)CF_2O]_3CF(CF_3)COOCH_2CH_2O(CH_2CH_2O)_{12}CH_3$ | 58.7 | 58.5 | 86.9 |
| 13... $R_fO[CF(CF_3)CF_2O]_{13}CF(CF_3)COOCH_2CH_2O(CH_2CH_2O)_6CH_3$ | 59.9 | 59.7 | 95.9 |
| 14... $R_fO[CF(CF_3)CF_2O]_{36}CF(CF_3)COOCH_2CH_2O(CH_2CH_2O)_6CH_3$ | 63.5 | 63.3 | 92.4 |
| 15... $R_fO[CF(CF_3)CF_2O]_{36}CF(CF_3)COOCH_2CH_2O(CH_2CH_2O)_{15}CH_3$ | 59.1 | 59.0 | 93.0 |

EXAMPLE 3

Emulsion formation

The utility of the compounds of the present invention as emulsifiers for polyfluorinated compounds and water is evident from the data shown in Table II below. The emulsion samples utilized in these tests were of two types, one made up of water, 1,1,2-trichloro-1,2,2-trifluoroethane (designated A in the table) and a designated compound of this invention and the other made up of water, an isomeric mixture of bis(trifluoromethyl) perfluorocyclobutane (designated B in the table) and a designated compound of this invention. After preparation of the emulsion samples, they were allowed to sit for approximately five days before the commencement of emulsion stability testing which consisted of visual observance of the status of the emulsion of each sample.

TABLE II.—EMULSIONS

| Compound ($R_f$=$CF_3CF_2CF_2$—) | Concentration (g./100 ml.) | Emulsion system (parts by vol.) Water | A | B | Emulsion stability |
|---|---|---|---|---|---|
| 1.... $R_fO[CF(CF_3)CF_2O]CF(CF_3)COOCH_2CH_2O(CH_2CH_2O)_6CH_3$ | 0.87 | 5 | 95 | | Good. |
| 2.... $R_fO[CF(CF_3)CF_2O]_3CF(CF_3)COOCH_2CH_2O(CH_2CH_2O)_3CH_3$ | 1.00 | 5–10 | 90–95 | | Do. |
| 3.... $R_fO[CF(CF_3)CF_2O]_8CF(CF_3)COOCH_2CH_2O(CH_2CH_2O)_6CH_3$ | 1–5 | 5–10 | 90–9 | | Very good |
| 4.... $R_fO[CF(CF_3)CF_2O]_8CF(CF_3)COOCH_2CH_2O(CH_2CH_2O)_6CH_3$ | 1–5 | 5–10 | | 90–95 | Do. |
| 5.... $R_fO[CF(CF_3)CF_2O]_{13}CF(CF_3)COOCH_2CH_2O(CH_2CH_2O)_6CH_3$ | 1.00 | 5 | | 95 | Do. |

EXAMPLE 4

Surface tension

The utility of the compounds of the present invention as surface active agents is clearly demonstrated by the data summarized in Table III below which shows measurements of surface tensions of the dilute aqueous solutions of these compounds at 25° C. using a Du Nouy tensiometer. It is to be noted that even at a concentration as low as 0.001%, outstanding effectiveness in lowering the surface tension is shown. The measured surface tension of water at 25° C. was 71.9 dynes/cm.

TABLE III

| Compound ($R_f$-$CF_3CF_2CF_2$—) | Surface tension (dynes/cm.) 0.001[1] | 0.01[1] | 0.1[1] | 1.0[1] |
|---|---|---|---|---|
| 1..... $R_fO[CF(CF_3)CF_2O]CF(CF_3)COOCH_2CH_2O(CH_2CH_2O)_6CH_3$ | 18.7 | 16.4 | 15.0 | 14.9 |
| 2..... $R_fO[CF(CF_3)CF_2O]CF(CF_3)COOCH_2CH_2O(CH_2CH_2O)_{15}CH_4$ | 32.4 | 23.4 | 19.0 | 15.5 |
| 3..... $R_fO[CF(CF_3)CF_2O]CF(CF_3)COOCH_2CH_2O(CH_2CH_2O)_{45}CH_3$ | 39.2 | 26.3 | 21.0 | 16.0 |
| 4..... $R_fO[CF(CF_3)CF_2O]CF(CF_3)COOCH_2CH_2O(CH_2CH_2O)_5H$ | 18.4 | 16.3 | 16.0 | 15.1 |
| 5..... $R_fO[CF(CF_3)CF_2O]CF(CF_3)COOCH_2CH_2O(CH_2CH_2O)_{30}H$ | 36.0 | 24.3 | 21.0 | 15.3 |
| 6..... $R_fO[CF(CF_3)CF_2O]CF(CF_3)COOCH(CH_3)CH_2O(CH(CH_3)CH_2O)_9H$ | 19.9 | 16.7 | 15.3 | 14.9 |
| 7..... $R_fO[CF(CF_3)CF_2O]_3CF(CF_3)COOCH_2CH_2O(CH_2CH_2O)_6CH_3$ | 25.7 | 17.9 | 17.2 | |
| 8..... $R_fO[CF(CF_3)CF_2O]_6CF(CF_3)COOCH_2CH_2O(CH_2CH_2O)_6CH_3$ | 27.2 | 18.2 | | |

[1] Compound concentration (gm./100 ml.).

EXAMPLE 5

Aqueous film spreading on hydrocarbon surface

The compounds of the present invention in contrast to many surfactants allow a film of water or foam to spread uniformly on the surface of hydrocarbons. As discussed previously, this property is of great importance when these esters are used in water or foam formulations employed in fighting hydrocarbon fires. The film spreading test of this example was carried out by placing 10 drops of a water solution of the surfactant compound on the surface of cyclohexane which was in a 125 mm. diameter evaporating dish and the time required for the aqueous film to completely cover the cyclohexane surface was recorded. The results of this test are shown in Table IV below.

TABLE IV.—AQUEOUS FILM SPREADING

| Compound ($R_f$-$CF_3CF_2CF_2$—) | Percent by weight | Film spreading (sec.) |
|---|---|---|
| 1.  $R_fO[CF(CF_3)CF_2O]_1CF(CF_3)$ $COOCH_2CH_2O(CH_2CH_2O)_{15}CH_3$ | 0.1<br>1.0 | 180<br>10 |
| 2.  $R_fO[CF(CF_3)CF_2O]_2CF(CF_3)$ $COOCH_2CH_2O(CH_2CH_2O)_{15}CH_3$ | 0.1<br>1.0 | 75<br>5 |

At $n=0$ e.g.

$$R_fOCF(CF_3)COOCH_2CH_2O(CH_2CH_2O)_{15}CH_3$$

a 2 weight percent solution of the compound caused a film to spread over the surface in 60 seconds. Lesser concentrations of the compound wherein $n=0$ are, however, not recommended.

While the present invention is illustrated in terms of esters having a perfluoroalkyl radical designation for $R_f$, it is quite conceivable that the hexafluoropropylene oxide polymerization could take place in the presence of a perfluoroaromatic acyl fluoride such as $C_6F_5COF$ and that the resultant $R_f$ e.g., $C_6F_5CF_2$— could be utilized in the same manner as a perfluoroalkyl radical in the production of an equally effective ester.

The foregoing detailed description has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound represented by the formula:

$$R_fO[CF(CF_3)CF_2O]_nCF(CF_3)COO—R^1—O(CHR^2CHR^3O)_yR^4$$

wherein $R_f$ is a perfluoroalkyl radical having 1 to 8 carbon atoms, $n$ is an integer of 0 to 100, $R^1$ is an alkylene radical having 2 to 12 carbon atoms, $R^2$ is hydrogen or an alkyl radical having 1 to 4 carbon atoms, $R^3$ is hydrogen or an alkyl radical having 1 to 4 carbon atoms, at least 1 of $R^2$ and $R^3$ in each repeating unit being hydrogen, $y$ is an integer of 1 to 60, and $R^4$ is hydrogen or an alkyl radical having 1 to 4 carbon atoms.

2. A compound according to claim 1 wherein $R_f$ is $CF_3CF_2CF_2$—.

3. A compound according to claim 1 wherein $R_f$ is $CF_3$—.

4. A compound according to claim 1 wherein $R^1$ is an alkylene radical having 2 carbon atoms.

5. A compound according to claim 1 wherein $R^2$ is hydrogen.

6. A compound according to claim 1 wherein $R^2$ is an alkyl radical having 1 to 4 carbon atoms.

7. A compound according to claim 1 wherein $R^3$ is hydrogen.

8. A compound according to claim 1 wherein $R^3$ is an alkyl radical having 1 to 4 carbon atoms.

9. A compound according to claim 1 wherein both $R^2$ and $R^3$ are hydrogen.

10. A compound according to claim 1 having the formula $$CF_3CF_2CF_2O[CF(CF_3)CF_2O]_8CF(CF_3)COOCH_2CH_2O(CH_2CH_2O)_6CH_3.$$

11. A compound according to claim 1 having the formula $$CF_3CF_2CF_2O[CF(CF_3)CF_2O]CF(CF_3)COOCH_2CH_2O(CH_2CH_2O)_5H.$$

References Cited

UNITED STATES PATENTS 3,442,942  5/1969  Sianesi etl. al. _____ 260—544

LEWIS GOTTS, Primary Examiner

P. J. KILLOS, Assistant Examiner

U.S. Cl. X.R.

252—358; 260—535 H, 544 F